US011850799B2

(12) United States Patent
Jen et al.

(10) Patent No.: US 11,850,799 B2
(45) Date of Patent: Dec. 26, 2023

(54) POWDERED SURFACE MONITORING SYSTEM OF ADDITIVE MANUFACTURING

(71) Applicant: NATIONAL CHUNG SHAN INSTITUTE OF SCIENCE AND TECHNOLOGY, Taoyuan (TW)

(72) Inventors: Kuo-Kuang Jen, Taoyuan (TW); Yi-Cherng Ferng, Taoyuan (TW); Chia-Hsiang Chang, Taoyuan (TW); Chun-Hsiang Huang, Taoyuan (TW); Yuan-Yao Lin, Taoyuan (TW); Chao-Kuei Lee, Taoyuan (TW); Yi-Jen Chiu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 17/973,552

(22) Filed: Oct. 26, 2022

(65) Prior Publication Data

US 2023/0302735 A1  Sep. 28, 2023

(30) Foreign Application Priority Data

Dec. 28, 2021  (TW) .................................. 110149165

(51) Int. Cl.
*B29C 64/386* (2017.01)
*B29C 64/153* (2017.01)
*B29C 64/286* (2017.01)
*B29C 64/268* (2017.01)
*B33Y 50/00* (2015.01)
*B33Y 30/00* (2015.01)

(52) U.S. Cl.
CPC .......... *B29C 64/386* (2017.08); *B29C 64/153* (2017.08); *B29C 64/268* (2017.08); *B29C 64/286* (2017.08); *B33Y 50/00* (2014.12); *B33Y 30/00* (2014.12)

(58) Field of Classification Search
CPC ... B29C 64/153; B29C 64/386; B29C 64/393; B33Y 50/00; B33Y 50/02; C04B 35/64
See application file for complete search history.

(56) References Cited

U.S. PATENT DOCUMENTS 5,427,733 A * 6/1995 Benda .................. B29C 64/153
  419/10
10,695,983 B2 * 6/2020 Engel .................. B23K 26/034
(Continued)

FOREIGN PATENT DOCUMENTS

CN  108025361 A  5/2018
CN  110174408 A  8/2019
(Continued)

*Primary Examiner* — Atul P. Khare

(57) ABSTRACT

A powdered surface monitoring system of additive manufacturing comprises an additive manufacturing processing cavity, having therein a working area carrying powder to be sintered; a laser source, generating a laser beam, which passes through a reflector, a dichroic mirror and a scanning vibration mirror and is transmitted to an upper surface of the powder in the working area; a polarization imaging device, having therein a beam expander group, a polarizer group and at least one photodetector, the polarizer group consisting of a plurality of linear polarizers, and the number of photodetectors being equal to the number of the linear polarizers.

8 Claims, 5 Drawing Sheets

(56) References Cited

U.S. PATENT DOCUMENTS

| | | | | |
|---|---|---|---|---|
| 10,850,326 B2* | 12/2020 | Ashton | ............... | B29C 64/393 |
| 10,913,130 B2* | 2/2021 | Webster | ............... | B23K 15/08 |
| 2013/0168902 A1* | 7/2013 | Herzog | ............. | B23K 26/0622 |
| | | | | 264/401 |
| 2018/0154443 A1* | 6/2018 | Milshtein | ........... | B23K 26/0626 |
| 2021/0268586 A1* | 9/2021 | Takeshita | ............. | B22F 10/364 |
| 2022/0072620 A1* | 3/2022 | Widulle | ................ | B33Y 10/00 |
| 2022/0168840 A1* | 6/2022 | Engel | ................... | B33Y 10/00 |

FOREIGN PATENT DOCUMENTS

| | | |
|---|---|---|
| CN | 111319259 A | 6/2020 |
| CN | 113784832 A | 12/2021 |

* cited by examiner

POWDERED SURFACE MONITORING SYSTEM OF ADDITIVE MANUFACTURING

CROSS-REFERENCE TO RELATED APPLICATION

This non-provisional application claims priority under 35 U.S.C. § 119(a) on Patent Application No. 110149165 filed in Taiwan, R.O.C. on Dec. 28, 2021, the entire contents of which are hereby incorporated by reference.

BACKGROUND OF THE INVENTION

1. Field of the Invention

The present invention relates to an optical monitoring technique, and in particular to a powdered surface monitoring system of additive manufacturing for monitoring a status of a surface of a molten pool of an additive manufacturing system.

2. Description of the Related Art

Laser additive manufacturing, particularly sintering methods of metal powder materials, has a global output value exceeding 950 million US dollars in 2016, and even over 2.2 billion US dollars in 2019. According to this trend, the output value is expected to exceed 6.6 billion US dollars in 2026. Therefore, laser additive manufacturing is an industrial technique with extremely high development potential. One of the main development techniques of this industry is the monitoring during the processing procedure. In Selective Laser Melting processing, the status of a powdered surface within a working area before additive manufacturing sintering and monitoring of the state of a molten pool during sintering are most critical conditions for enhancing processing quality and reducing processing costs. Thus, such concepts are highly valued by many research teams in recent years, and in response, novel monitoring approaches or high integration merging systems have been routinely proposed.

In the prior art, two methods are primarily used to achieve the object of monitoring a status of a powdered surface in a working area in additive manufacturing. In the first method, one or more CCDs or CMOS image detectors are used in coordination with a structured light projection technique to calculate and construct a surface profile by means of projected light deformation, and the structured light projection may also be aided by computer vision and triangularization to restore the surface profile. In the second method, on the basis of a laser scanner in an additive manufacturing system, optical tomography is used to construct an interferometer system for interferometric measurement with a low-coherence light source, and the contrast produced by interference is used as the basis for the determination of surface fluctuations.

In the first method of the prior art described above, a phase-shift structured light projection technique is used to obtain multiple fringe images, and then a three-dimensional surface profile is established according to an algorithm. Multiple images form a time multiplexing mode and bright lines are caused to completely cover the entire object to be tested. In terms of time, irradiation of multiple images requires a high-speed and high-resolution camera in order to accelerate the image capturing process. Moreover, the demodulation time is also one factor that needs to be considered. Although an overly large number of images can improve the resolution, multiple times of amount of information and processing time are also needed. Further, an optical system needs to be re-established based on the way the image is phase-shifted. When a laser additive manufacturing system is an integration subject, a larger space needs to be preserved at a machine. Meanwhile, during the process of Selective Laser Melting processing, harsh environmental conditions such as high temperatures and dust within a processing cavity are unsuitable for directly arranging CCDs and a projector in the cavity, and an additional view window is opened at the structure of the cavity for imaging by the projector and CCDs, resulting in increased structural complexities of the processing cavity and difficulties of system integration. In the second method, surface topography detection is performed by optical tomography (OCT), an interferometer system is constructed, on the basis of a laser scanner in an additive manufacturing system, for interferometric measurement with a low-coherence light source, and the contrast produced by interference is used as the basis for the determination of surface fluctuations. The scanning operation means can more easily integrate OCT into the additive manufacturing system. Moreover, OCT is considered an interfering means, and provides excellent axial resolution under a wide light source bandwidth. However, such interfering means requires higher system stability, and when the overall scale of the system is large, an error can be easily generated due to element and environmental vibrations.

Therefore, there is a need for a powdered surface status monitoring system of an additive manufacturing system capable of measuring a surface profile when a powder material is laid out, enhancing precision of additive manufacturing processing and processing efficiency, and reducing production costs.

BRIEF SUMMARY OF THE INVENTION

To overcome the issues of the prior art, the present invention provides a powdered surface monitoring system of additive manufacturing. The system includes: an additive manufacturing processing cavity, having therein a working area carrying powder to be sintered; a laser source, generating a laser beam, which passes through a reflector, a dichroic mirror and a scanning vibration mirror and is transmitted to an upper surface of the powder in the working area; a polarization imaging device, having therein a beam expander group, a polarizer group and at least one photodetector, the polarizer group consisting of a plurality of linear polarizers, and the number of the photodetector being equal to the number of the linear polarizers.

The present invention relates to a powdered surface monitoring system of additive manufacturing. After the laser beam is transmitted to the upper surface of the powder in the working area, reflected light and diffuse reflected light are generated. The reflected light and the diffuse reflected light pass through the scanning vibration mirror and the dichroic mirror and are transmitted into the polarization imaging device. The beam is expanded by the beam expander group, and passes through the polarizer group. One photodetector is placed at a backend of each of the linear polarizers of the polarizer group to measure the intensity of each polarized light. Intensity data of the polarized light is transmitted to a computing unit. The computing unit obtains, according to the intensity data of the light, a polarization image of a region currently irradiated by the laser beam. Image data within an entirety of the working area irradiated by the laser beam is collected to obtain an overall surface profile image of the upper surface of the powder in the working area.

In an embodiment of the present invention, the laser source uses randomly polarized or circularly polarized laser light.

In an embodiment of the present invention, the polarizer consists of four linear polarizers.

In an embodiment of the present invention, passable directions of the four linear polarizers are 0°, 45°, 90° and 135°, respectively.

In an embodiment of the present invention, the laser source, the reflector, the dichroic mirror and the scanning vibration mirror are placed outside the additive manufacturing processing cavity.

In an embodiment of the present invention, the additive manufacturing processing cavity has a window outside and above the cavity for the laser beam emitted by the laser source to pass through and enter the working area in the processing cavity.

In an embodiment of the present invention, the beam expander group consists of a concave lens and a convex lens.

In an embodiment of the present invention, after the computing unit collects all the normal vector images of reflecting surfaces in the working area, the overall surface profile image of the upper surface of the powder in the working area is obtained.

In an embodiment of the present invention, after the computing unit calculates, according to coordinate information provided by the scanning vibration mirror, a normal vector image of a reflecting surface of the powdered surface at coordinates of a region currently irradiated by the laser beam, and collects the normal vector images of reflecting surfaces at all coordinates in the working area, and the overall surface profile image of the upper surface of the powder in the working area is obtained.

The summary above and the detailed description and drawings below are for better illustrating and understanding the methods and means for achieving expected objects and effects thereof. Other objects and advantages of the present invention are also further given in the description and drawings below.

DETAILED DESCRIPTION OF THE INVENTION

Implementation details of the present invention are described by way of specific embodiments for a person skilled in the art to easily and fully understand other advantages and effects of the present invention on the basis of the disclosure of the present application.

Figure 1:
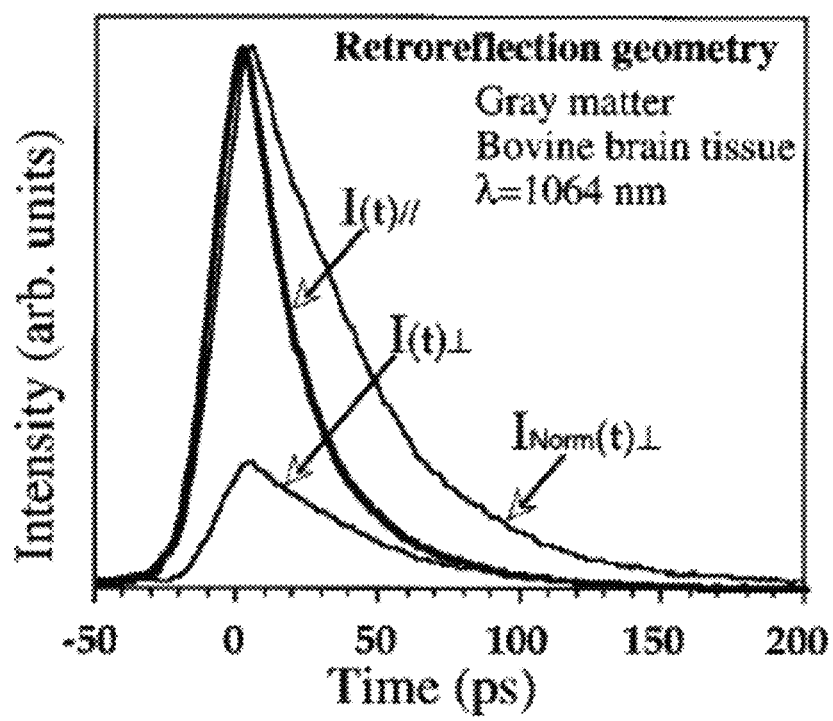
FIG. 1 (Prior art) is a timing response diagram of different polarization states of the prior art.
Figure 2:
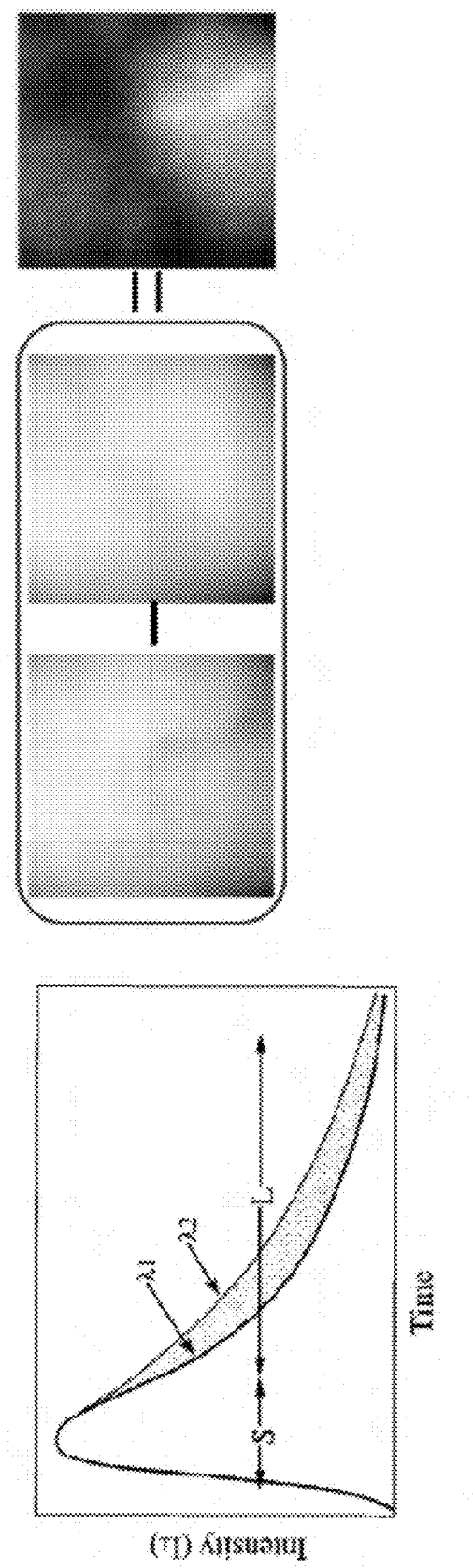
FIG. 2 (Prior art) includes schematic diagrams illustrating principles of polarization imaging of the reference documents.

The powdered surface monitoring system of additive manufacturing of the present invention obtains, by using an optical polarization imaging technique, an image of a powdered surface profile (high and low fluctuation distribution) after a powdering process in an additive manufacturing processing procedure, as a reference basis for control factors including laser power, time and route of a subsequent sintering process. Regarding optical polarization imaging (OPI), when electromagnetic waves are reflected by an interface, the vibration radiation and phase of reflected light are related to the direction of a reflecting surface, and time responses of different polarization states are different (as shown in FIG. 1 depicting time responses of different polarization states), such that polarization characteristics can be used as tools to measure the normal direction of the surface. Further with polarization processing, minute structures on the surface can be displayed. The reference document, S. G. Demos and R. R. Alfano, "Optical Polarization Imaging," Appl. Opt. 36, 150-155 (1997), points out that subtraction of different polarization images can emphasize minute changes of surface structures, for example, palmprint structures. If responses of reflected (scattering) light of different wavelengths are considered, it is also discovered that the differences therein can be used to analyze surface images. As shown in FIG. 2, the left part of FIG. 2 shows time responses of different wavelengths for a vertical polarization state, and the right part shows an image of a palm when vertical polarization at 570 nm is subtracted from vertical polarization at 600 nm.

Figure 3:
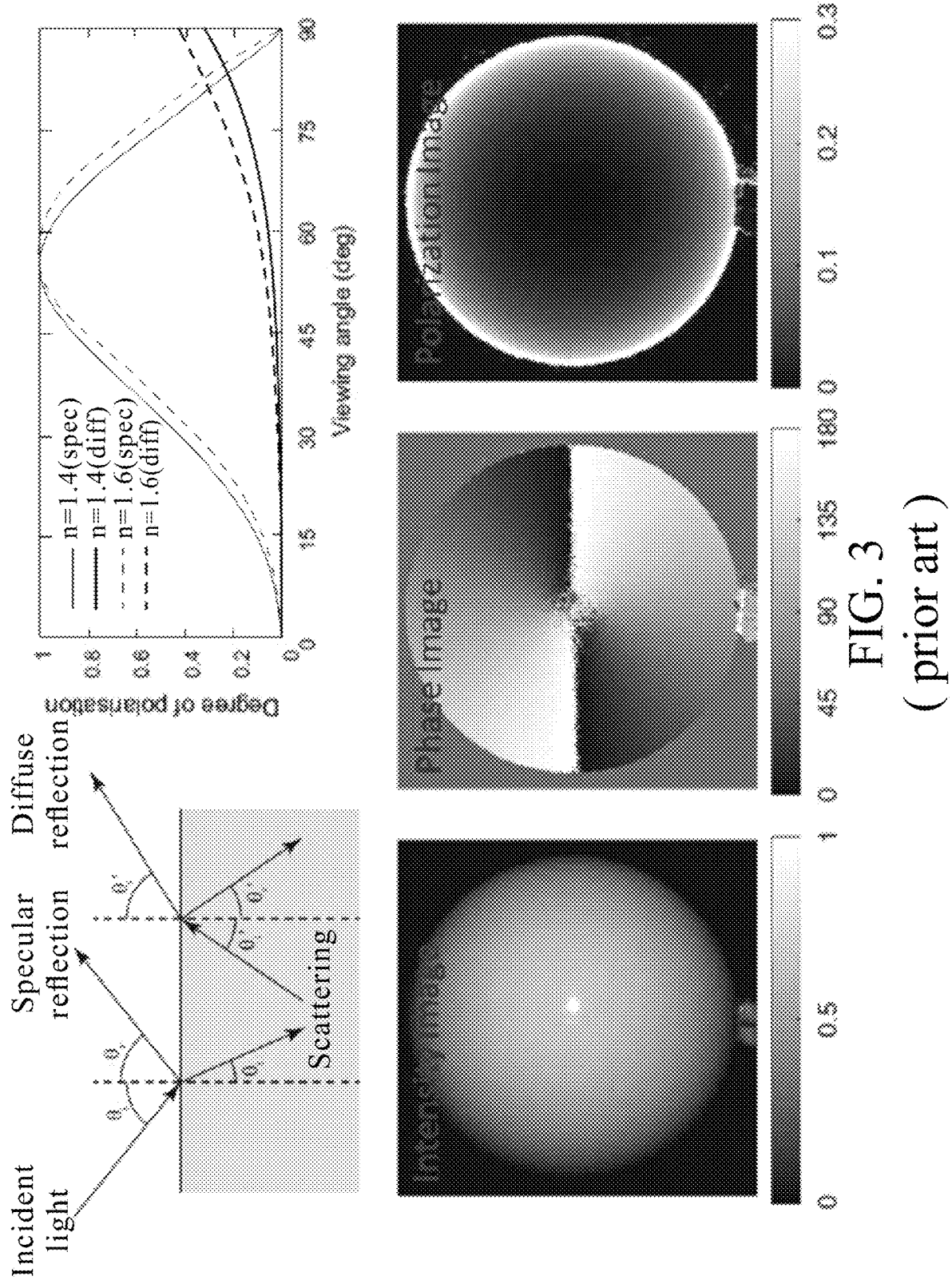
FIG. 3 (Prior art) includes schematic diagrams illustrating principles of polarization imaging of the reference documents.

In recent years, polarization imaging is one critical technique in the field of machine vision. Some main reasons for the above include, polarization information can be readily acquired, intensity information of specific linear polarized light can be extracted by polarizers, and polarization states with respect to geometric factors, that is, responses of surface normals, can be easily obtained in terms of image processing. In a study in 2018, Gary A. Atkinson and Jurgen D. Ernst, "High-Sensitivity Analysis of Polarization by Surface Reflection," Machine Vision and Applications 29, 1171-1189 (2018), points out that polarization images are applied to surface topography measurement. Once the polarization of incident light changes, the polarizability of reflected light (diffuse reflected light) also changes, and a large amount of change indicates characteristics of high reaction intensity. For example, FIG. 3 shows a schematic diagram illustrating the principles of polarization imaging of the reference document, and includes an intensity image (bottom-left), a phase image (bottom-center) and a polarization image (bottom-right) of a pool ball. The grayscale of the polarization image can easily associate with an incident angle of reflected light. The normal vector of the reflecting surface is analyzed, and a mathematical model and an image processing procedure (for example, methods disclosed by reference documents, Antonio Robles-Kelly and Edwin. R. Hancock, "A Graph-Spectral Method for Surface Height Recovery from Needle-maps," Proceedings of the 2001 IEEE Computer Society Conference on Computer Vision and Pattern Recognition, and G. A. Atkinson and E. R. Hancock, "Recovery of surface orientation from diffuse polarization," in IEEE Transactions on Image Processing, vol. 15, no. 6, pp. 1653-1664, June 2006, doi: 10.1109/TIP.2006.871114) are used to calculate an image of the surface height (profile). In the implementation of the method of the present invention, a polarization change caused by an incident angle of scanning light should be noted, that is, the part of the incident angle needs to be subtracted from the polarization extent measured. The system of the present invention may also construct an image of the surface profile by means of polarization rate imaging of thermal radiation.

Figure 4:
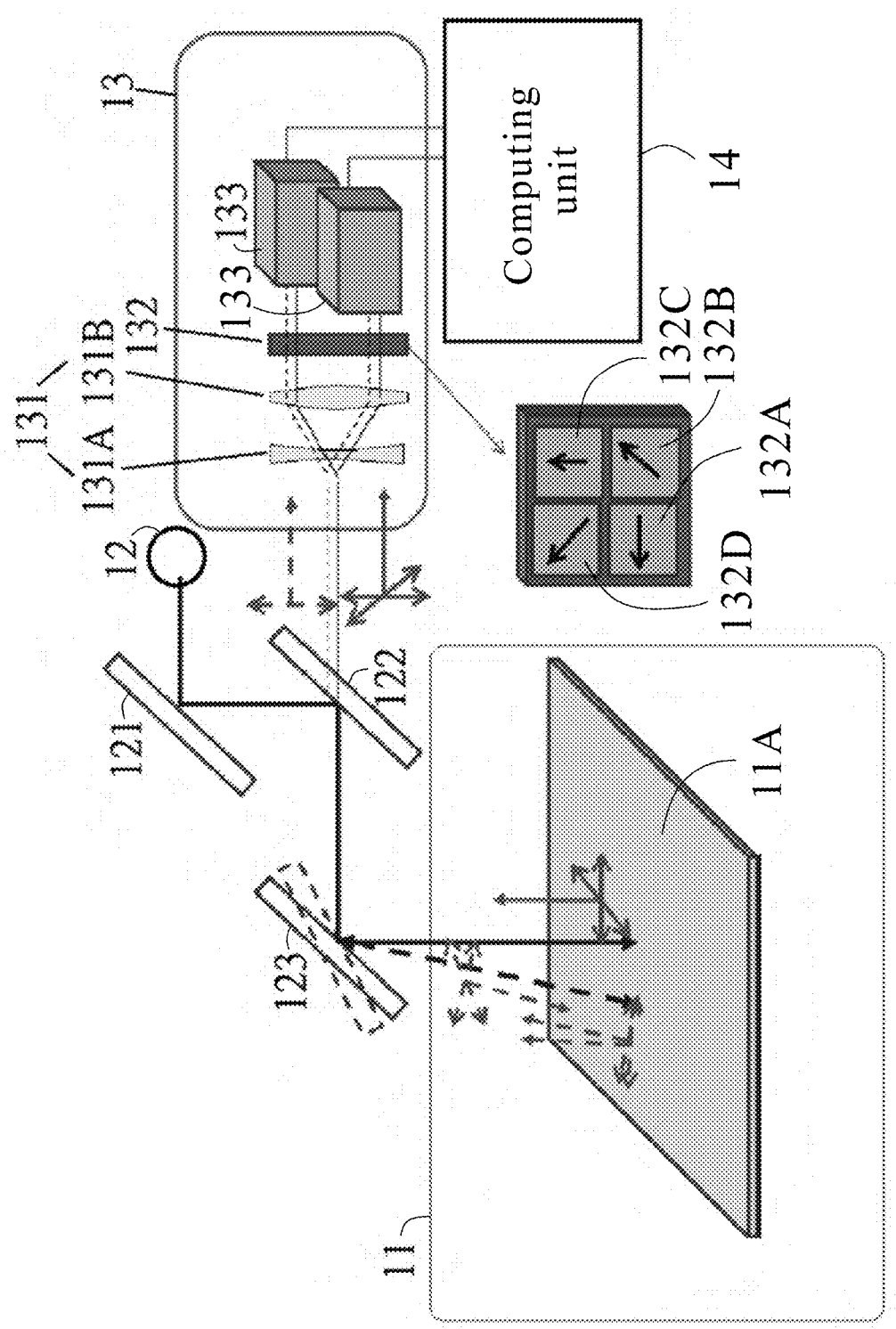
FIG. 4 is a structural diagram of a powdered surface monitoring system of additive manufacturing of the present invention.

As the structure shown in FIG. 4, the powdered surface monitoring system of additive manufacturing according to an embodiment of the present invention includes: an additive manufacturing processing cavity 11, having therein a working area 11A carrying powder to be sintered; a laser source 12, generating a laser beam, which passes through a reflector 121, a dichroic mirror 22 and a scanning vibration mirror 123 and is transmitted to the working area 11A (carrying the powder to be sintered); a polarization imaging device 13, having therein a beam expander group 131 (consisting of a concave lens 131A and a convex lens 131B), a polarizer group 132 and at least one photodetector 133, the polarizer group 132 consisting of a plurality of linear polarizers 132A to 132D, and the number of the photodetectors being equal to the number of the linear polarizers. Once the laser beam generated by the laser source 121 is transmitted to an upper surface of the powder in the working area 11A, reflection light and diffuse reflection light are generated. The reflection light and the diffuse reflection light pass through the scanning vibration mirror 123 and the dichroic mirror 122 and are transmitted into the polarization imaging device 13. The beam is expanded by the beam expander group 131, and passes through the polarizer group. One photodetector 133 is placed at a backend of each of the linear polarizers 132A, 132B, 132C and 132D (four in this embodiment) of the polarizer group 132 to measure the intensity of each polarized light. Intensity data of the polarized light is transmitted to a computing unit 14. The computing unit 14 synchronously combines coordinate information of the scanning vibration mirror, and calculates normal vector images of reflecting surfaces of the powder in a region irradiated by the laser beam. Wherein, passable directions of the four linear polarizers are 0°, 45°, 90° and 135°, respectively.

In an embodiment of the present invention, the computing unit 14 calculates, according to coordinate information provided by the scanning vibration mirror, the normal vector image of the reflecting surface of the powdered surface at the coordinates of a region currently irradiated by the laser beam. Once the scanning operation performed by the laser beam on the upper surface of the powder within the entire working area is complete and the computing unit 14 collects the normal vector images of reflecting surfaces at all coordinates in the working area, the overall surface profile image of the upper surface of the powder in the working area can be calculated, established and obtained. Data of the overall surface profile image is further fed back to a sintering process to fine-turn control parameters such as sintering temperature, power and time of different powdered regions, thereby enhancing the quality and yield rate of finished products of workpieces of additive manufacturing. The present invention can also be used as a feedback indicator of a powdering status for a user to learn in real time the outcome of the powdering process, including levelness of the powdered surface and the density of the powder material, in order to serve as references for parameter adjustments of subsequent processes and design improvements of devices.

In an embodiment of the present invention, the laser source may be coaxial and share an optical path with the sintering laser used in the additive manufacturing. In general, a laser device for sintering in additive manufacturing is provided outside a working cavity, and a laser beam is allowed to enter the cavity through a window above the cavity to perform sintering in the cavity, so as to prevent undesirably environmental factors such as dust and high temperatures in the cavity from affecting working precision and efficiency. Thus, the laser source of the present invention only needs to use the existing path of the laser beam used for sintering, hence reducing costs of repeated hardware installations. Moreover, the present invention can use the laser for sintering as a light source of the reflected light for optical polarization imaging of the present invention. The laser beam used in the present invention does not need to be provided with a large power, given that reflected light sufficient for processing of the polarization imaging device can be produced. A user may select the power, type and number of the laser source according to requirements, provided that the use of the optical polarization imaging technique and system structure of the present invention meet the technical and spirit and scope of the present invention.

Figure 5:
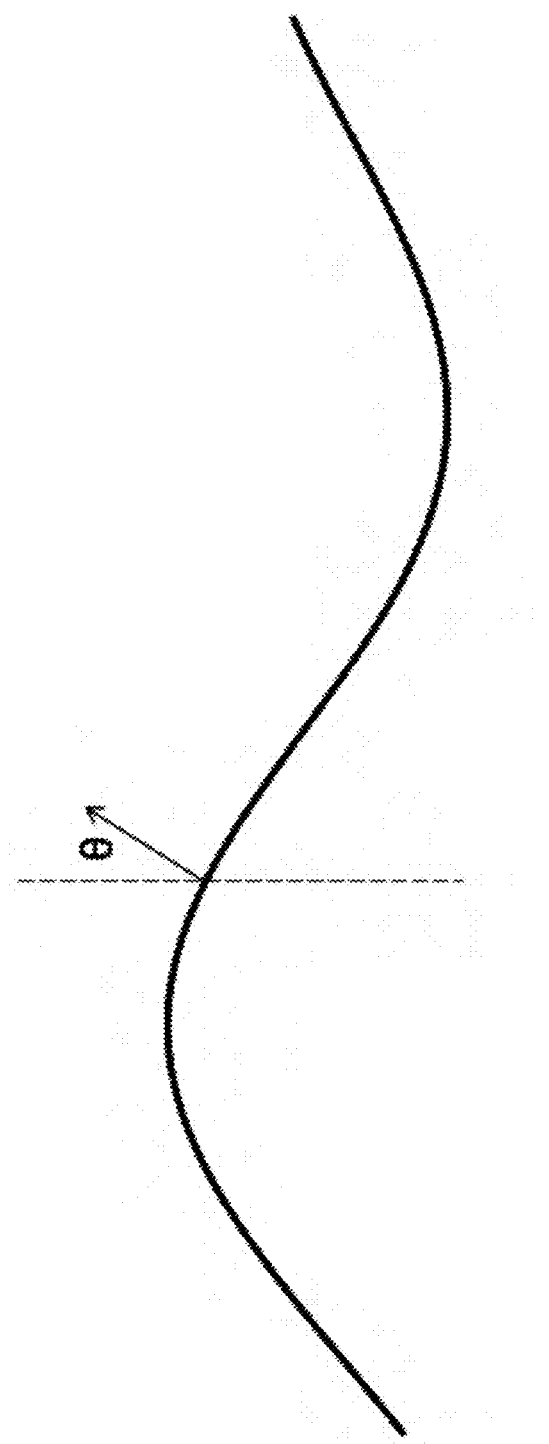
FIG. 5 is an exemplary curve diagram of a computing step of the present invention.

In an embodiment of the present invention, the method for converting polarization image data of a region currently irradiated by a laser beam into the height of powder is disclosed in many documents. For example, reference can be made to the following calculation means provided by documents of the prior art:

1. According to the obtained light intensity, a polarization image p d data is acquired, with a curve thereof as shown in FIG. 5.
2. A zenith angle θ is acquired by using the equation below. This method can be referred from the document of the prior art, Gary A. Atkinson, and Edwin R. Hancock, "Recovery of Surface Orientation From Diffuse Polarization," IEEE TRANSACTIONS ON IMAGE PROCESSING, VOL. 15, 1653 (2006).

$$\rho_d = \frac{(n-1/n)^2\sin^2\theta}{2+2n^2-(n+1/n)^2\sin^2\theta+4\cos\theta\sqrt{n^2-\sin^2\theta}}$$

3. A surface height is reconstructed by means of spectrum. This step can be referred from, A. Robles-Kelly and E. R. Hancock, "A graph-spectral method for surface height recovery from needle-maps," in Proc. Computer Vision Pattern Recognition, 2001, pp. 141-148.

It should be noted that, regarding the approaches for converting the intensity data of the polarized light into a polarization image and calculating and generating surface profile information of the upper surface of the powder in the additive manufacturing working area used in the powdered surface monitoring system of additive manufacturing of the present invention, there are numerous methods that can be selected from documents of the prior art, instead of being limited to the approaches used in the documents referenced by the present invention. Any polarization imaging technique used for surface profiling of powder in additive manufacturing, which is used in conjunction with the concept of the coaxial laser structure proposed by the present invention, is considered to satisfy the technical spirit of the present invention.

Thus, the present invention provides a powdered surface monitoring system of additive manufacturing. In the present invention, an optical polarization imaging technique is used to obtain a high and low fluctuating image of a powdered surface in additive manufacturing, and control parameters such as laser power, route and time in a sintering process of additive manufacturing are accordingly adjusted, so as to enhance sintering effects and the yield rate of finished products of sintered workpieces. The powdered surface monitoring system of additive manufacturing of the present invention can be integrated in an additive manufacturing system and use an existing laser path of the additive manufacturing system, eliminating any additional optical path design and hardware costs. In the present invention, the laser source used for measurement and the laser source used for sintering are in a coaxial arrangement, or the laser source used for sintering may be directly used to generate reflected light data used for measurement of the present invention, providing high application flexibilities. The devices and components of the present invention are not required to be installed in a working cavity, and working efficiency and precision are thus free from undesirable environmental conditions such as dust and high temperatures, while further providing advantages of easy maintenance.

It should be noted that, the embodiments described above are merely examples for illustrating the features and effects of the present invention, and are not to be construed as limitations to the substantial technical contents of the present invention. Without departing from the spirit and scope of the present invention, modifications and variations may be made to the embodiments above by a person skilled in the art. Therefore, the scope of protection of the present invention should be accorded with the broadest interpretation of the appended claims.

What is claimed is:

1. A powdered surface monitoring system of additive manufacturing, comprising:
    an additive manufacturing processing cavity, having therein a working area carrying powder to be sintered;
    a laser source, generating a laser beam, which passes through a reflector, a dichroic mirror and a scanning vibration mirror and is transmitted to an upper surface of the powder in the working area; and
    a polarization imaging device, having therein a beam expander group, a polarizer group and at least one photodetector, the polarizer group consisting of a plurality of linear polarizers, a number of the at least one photodetector being equal to a number of the linear polarizers;
    wherein, once the laser beam is transmitted to the upper surface of the powder in the working area, reflected light and diffuse reflected light are generated therefrom; the reflected light and the diffuse reflected light pass through the scanning vibration mirror and the dichroic mirror and are transmitted into the polarization imaging device; the reflected light and the diffuse reflected light are amplified by the beam expander group and pass through the polarizer group; a respective one of the photodetectors is placed at a backend of each of the linear polarizers to measure an intensity of polarized light; intensity data of the polarized light is transmitted to a computing unit; the computing unit obtains, according to the intensity data of the polarized light, a polarization image of a region currently irradiated by the laser beam; and image data within an entirety of the working area currently irradiated by the laser beam is collected to obtain an overall surface profile image of the upper surface of the powder in the working area.

2. The powdered surface monitoring system of additive manufacturing according to claim 1, wherein the laser source uses randomly polarized or circular polarized light for the laser beam.

3. The powdered surface monitoring system of additive manufacturing according to claim 1, wherein the polarizer group consists of four linear polarizers.

4. The powdered surface monitoring system of additive manufacturing according to claim 3, wherein passable directions of the four linear polarizers are 0°, 45°, 90° and 135°, respectively.

5. The powdered surface monitoring system of additive manufacturing according to claim 1, wherein the laser source, the reflector, the dichroic mirror and the scanning vibration mirror are placed outside of the additive manufacturing processing cavity.

6. The powdered surface monitoring system of additive manufacturing according to claim 5, wherein the additive manufacturing processing cavity has a window outside and above the additive manufacturing processing cavity to allow the laser beam emitted by the laser source to pass therethrough and enter the working area in the additive manufacturing processing cavity.

7. The powdered surface monitoring system of additive manufacturing according to claim 1, wherein the beam expander group consists of a concave lens and a convex lens.

8. The powdered surface monitoring system of additive manufacturing according to claim 1, wherein the computing unit calculates, according to coordinate information provided by the scanning vibration mirror, a normal vector image of a reflecting surface of the powdered surface at coordinates of a region thereof currently irradiated by the laser beam, and collects the normal vector image of reflecting surfaces at all coordinates in the working area irradiated by the laser beam, to obtain the overall surface profile image of the upper surface of the powder in the working area.

* * * * *